(12) United States Patent
Wisniewski

(10) Patent No.: US 7,127,814 B2
(45) Date of Patent: Oct. 31, 2006

(54) METHOD AND DEVICE FOR MACHINING ANNULAR-SHAPED WORKPIECES

(75) Inventor: Horst Wisniewski, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 238 days.

(21) Appl. No.: 10/477,013

(22) PCT Filed: Apr. 9, 2002

(86) PCT No.: PCT/EP02/03955

§ 371 (c)(1),
(2), (4) Date: May 19, 2004

(87) PCT Pub. No.: WO02/090028

PCT Pub. Date: Nov. 14, 2002

(65) Prior Publication Data

US 2004/0231154 A1 Nov. 25, 2004

(30) Foreign Application Priority Data

May 8, 2001 (DE) ................................ 101 22 249

(51) Int. Cl.
*B21D 53/84* (2006.01)
*B23P 19/02* (2006.01)
(52) U.S. Cl. ...................... 29/888.09; 29/426.4; 29/239
(58) Field of Classification Search ............. 29/888.09, 29/888.08, 888.092, 239, 413, 525.11, 526.2, 29/426.4, 426.1; 225/2, 96, 100; 526/245
See application file for complete search history.

(56) References Cited

U.S. PATENT DOCUMENTS

| | | | | |
|---|---|---|---|---|
| 4,686,267 A | * | 8/1987 | Ellis et al. ................... | 526/245 |
| 5,169,046 A | * | 12/1992 | Miessen et al. ............. | 225/100 |
| 5,551,782 A | | 9/1996 | Arnhold et al. | |
| 6,203,203 B1 | | 3/2001 | Schaefer | |
| 6,513,238 B1 | | 2/2003 | Schlegel | |
| 6,560,869 B1 | | 5/2003 | Schlegel et al. | |
| 6,698,637 B1 | * | 3/2004 | Hahnel et al. ................. | 225/96 |

FOREIGN PATENT DOCUMENTS

| | | |
|---|---|---|
| DE | 42 32 432 A1 | 3/1994 |
| DE | 43 03 592 A1 | 8/1994 |
| DE | 44 42 062 A1 | 5/1996 |
| DE | 197 31 625 A1 | 9/1998 |
| DE | 199 59 677 A1 | 12/1999 |
| DE | 198 38 745 A1 | 3/2000 |
| DE | 100 17 691 A1 | 10/2001 |
| EP | 0 167 320 A2 | 1/1986 |
| EP | 0 696 688 A1 | 2/1996 |

* cited by examiner

Primary Examiner—John C. Hong
(74) Attorney, Agent, or Firm—Wolf, Greenfield & Sacks P.C.

(57) ABSTRACT

A method and a device for machining workpieces having an annular-shaped section that is to be provided with a split bore. The device includes: a fracture-splitting device for fracture-splitting the annular-shaped workpiece section and for creating fracture-split workpiece parts corresponding with one another with a split bore; an applicator device for a plain-bearing material for applying at least one closed annular plain-bearing layer to the inner periphery of the split bore of the fracture-split workpiece; and a fracture-splitting device for the plain-bearing layer for fracture-splitting the closed annular plain-bearing layer of the previously fracture-split workpiece.

13 Claims, 1 Drawing Sheet

METHOD AND DEVICE FOR MACHINING ANNULAR-SHAPED WORKPIECES

TECHNICAL FIELD

Figure 1:
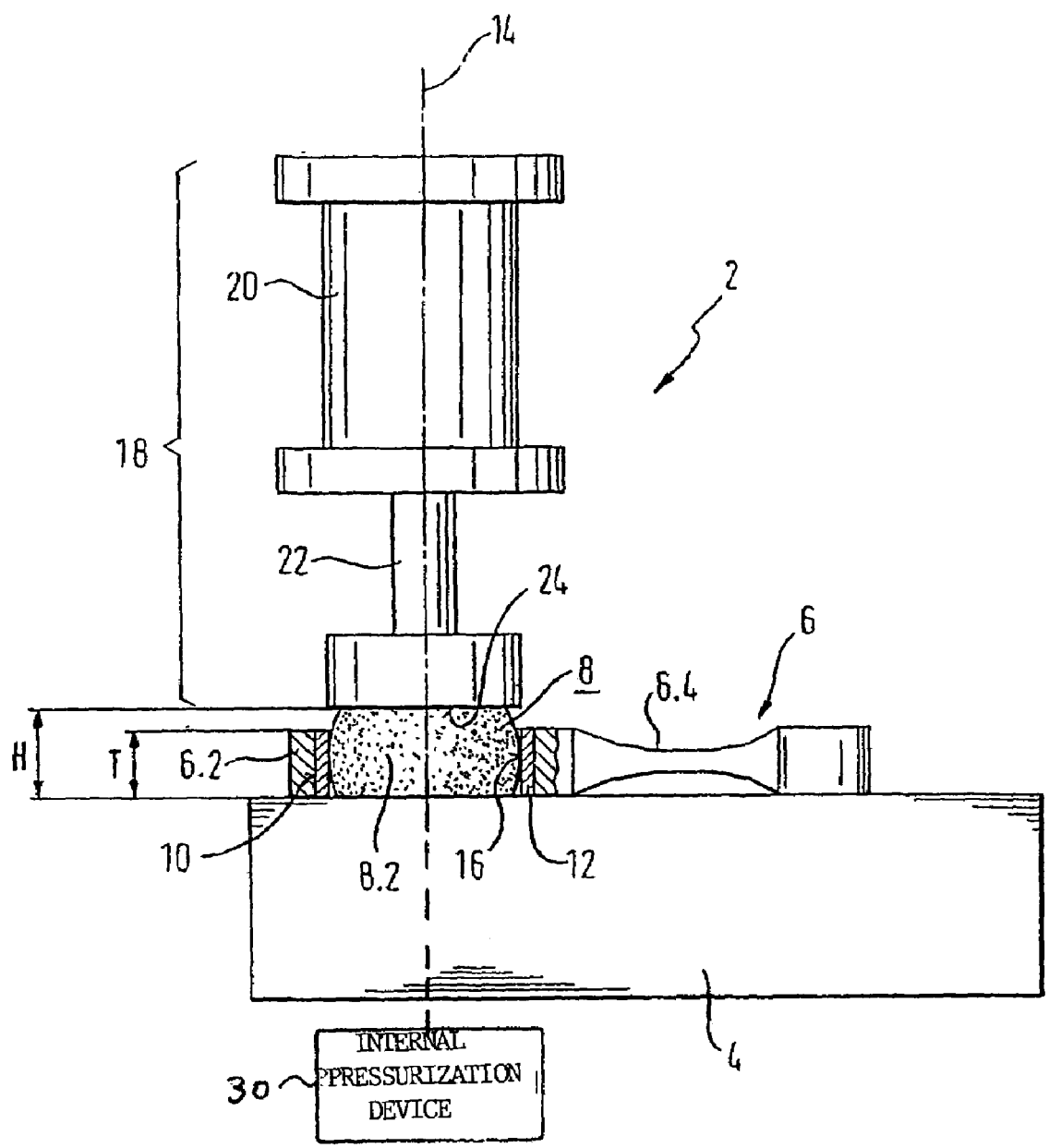

The present invention relates to a method and to a device for machining workpieces at least comprising an annular-shaped workpiece section that is to be provided with a split bore. Examples of such workpieces are connecting rods, annular-shaped housing sections or the like.

PRIOR ART

Methods are known in which workpieces having at least an annular-shaped workpiece section that is to be provided with a split bore (e.g. a connecting rod having a removable bearing cover) are manufactured by metal cutting. Due to the required precision of the split bore and the workpiece sections at the partition line of the bore, these conventional methods are however relatively complex and non-economical.

For this reason, machining methods known as fracture-splitting methods and fracture-splitting devices have been developed, wherein the annular-shaped workpiece is provided with at least one preset breaking point and is split or a workpiece section is completely removed by means of a fracture-splitting device which applies a spreading force to an inner periphery of the bore. By this technique, precise, fracture-split workpiece parts or workpiece areas corresponding to each other are produced by the microtoothing formed at the fractured surfaces.

Such fracture-splitting devices usually comprise a spreading device in the form of expansion jaws or expansion bushes which engage with the bore formed by the annular-shaped component part. In general, spreading jaw constructions comprise two parts, with one of the expansion jaws, having a cross-section which is essentially semicircular, being mostly stationary and the other being movable. By way of a spreading mechanism, e.g. a wedge driven between the spreading jaws or the like, the spreading jaws are pressed apart in the radial direction of the bore. Spreading bush constructions in turn have a bush which is circular in the cross-section and slit in the form of a crown, the bush segments thereof formed by the slits being able to be outwardly spread apart in the radial direction in a bending-elastically manner by means of driving-in a mandrel or the like. Both the expansion jaws as well as the expansion bushes are usually made of metal.

Fracture-splitting methods and fracture-splitting devices using expansion jaws are e.g. disclosed in EP-0-396 797 as well as in EP-0-661 125. Fracture-splitting methods and fracture-splitting devices using spreading bushes may, for example, be taken from DE 44 42 062 A1.

Further, it is generally known to provide the bores of annular-shaped one-piece or multi-piece workpieces or component parts of machines with a one-piece (e.g. closed) or multi-piece (e.g. split) bearing which is produced of a bearing material suited for the respective application. There are constructions in which the bearing material is inserted into the bore in the form of a separated bearing shell or bearing bush and e.g. soldered or glued thereinto, as well as those variants in which a bearing material is applied by a casting, centrifugal-casting, web-casting, roll-on, roll-bonded cladding, vapour-deposition, sputtering or an electroplating method and connected to the wall of the bore.

Based on the high requirements generally made of bearings regarding rigidity and accuracy of fit, the production of split bearing constructions is in particular very complex. These bearings further require considerable finishing steps. Altogether, split bearing constructions are rather cost-intensive.

SUMMARY OF THE INVENTION

The invention is based on the object or the technical problem to create a new machining method as well as a new machining device which allow(s) that workpieces which have at least one annular-shaped workpiece section are provided with a split bore and a bearing and that they are produced in a comparably simple and effective manner and that a high-quality end product is simultaneously obtained.

The above-indicated object is solved by a method according to the invention having the features of claim 1.

This method for machining workpieces which have at least an annular-shaped workpiece section that is to be provided with a split bore, comprises the following steps, however, not necessarily in the given order:

a) providing a workpiece having at least a preset breaking point;

b) applying a spreading force to an inner periphery of the bore for fracture-splitting the at least one annular-shaped workpiece section and for creating fracture-split workpiece parts (or areas) corresponding with one another with a split bore;

c) mating and detachably connecting the fracture-split workpiece parts resulting in step b);

d) applying at least one closed annular plain-bearing material layer to the inner periphery of the split bore of the fracture-split workpiece;

e) disengaging the connection between the workpiece parts mated and f) applying a spreading force to the entire inner periphery of the closed annular plain-bearing layer for fracture-splitting the plain-bearing layer.

The preset breaking point indicated in step a) is preferably made in the form of one or a plurality of fracture-splitting notches which define a predetermined fracture-splitting plane. These fracture-splitting notches can be produced by impacting, broaching, laser machining or another suited method.

A split bore along the lines of the invention is not only a bore which is separated or broken at two or more positions on its inner periphery, i.e. which may be formed by two or more separate workpiece parts, but also such a bore, wherein the inner periphery of the bore is only broken at one single position.

The detachable connection to be formed in step c) of the fracture-split workpiece parts resulting with step b) can be performed both by connection means self-attachable to said workpiece, such as e.g. screws engaging with the workpiece, as well as by external devices, such as e.g. work-holding fixtures or clamping devices. If the connection is performed by connection means to be fastened to the workpiece, the workpiece must appropriately already previously be equipped with corresponding accommodation means or fixture possibilities for these connection means. The manner of releasing the connection in step e) is arranged in accordance with the type of the connection previously selected.

A bearing material which is specially adapted to the respective application case and suited therefor, such as e.g. a bearing metal or a multi-substance bearing material, is used for the application of the plain-bearing material layer in step d). The workpiece sections previously fracture-split, i.e. which are either separated or completely removed, of the fracture-splitting plane produced on the inner edge portion and projecting through the inner periphery of the bore are again connected to each other by the application of the plain-bearing material layer.

In step f), this connection formed by the plain-bearing material layer is again separated, that is by a new separate fracture-splitting procedure which is especially matched to the plain-bearing material layer. Since the workpiece sections fracture-split in step b) do no longer have a direct cohesion, except by way of the plain-bearing material layer, and since the plain-bearing material layer is relatively thin, only relatively small forces are required for breaking the plain-bearing material layer. Since the plain-bearing material layer has, however, totally different material properties and, thus, another fracture-splitting behaviour than the remaining workpiece, the fracture-splitting of the plain-bearing material layer is preferably performed with other means and with other fracture-splitting parameters than those for the fracture-splitting of the initial work peace.

The inventors of the present subject matter of the application have recognized that in work pieces which have at least one annular-shaped workpiece section which is to be provided with a split bore with a split bearing, the bearing material can be applied to the workpiece area which was previously fracture-split, and the bearing material layer thus produced which again connects the workpiece parts which were previously fracture-split can then be separated by a renewed fracture-splitting step without cutting. Thus, for fracture-splitting the initial workpiece and fracture-splitting the bearing material layer, two fracture-splitting steps are thus required which are totally independent of each other. Contrary thereto, a method tested by the inventors for the purpose of a comparison, wherein the bearing material was first applied to an initial workpiece which was not fracture-split and wherein the workpiece was then fracture-split together with the bearing material layer in an operation process, did not provide satisfactory results.

As compared therewith, the invention achieves a high-quality end product with relative few method steps, wherein a microtoothing is formed across the whole fracture-splitting plane running through the workpiece and the plain-bearing layer, and wherein a regular joint having a high accuracy of fit and which does not need further finishing is particularly formed at the edge areas of the fracture-splitting plane meeting in the bore. Basically, the method according to the invention can be applied for workpieces which are equipped with only one single annular-shaped workpiece section as well as for workpieces which have a plurality of those sections arranged axially one behind the other or one beside the other. Thus, the method of the invention allows in a comparably simple, effective and very economical manner that workpieces are produced with a fracture-split annular-shaped workpiece section and a separated, fracture-split bearing of a high bearing quality and accuracy of fit which is arranged in this workpiece section. Complex finishing steps which would exceed the common finishing work of bearings are not required. As compared with conventional methods, this brings about a considerable cost reduction and, consequently, provides great rationalization possibilities.

In accordance with a particularly preferred embodiment of the method according to the invention, the plain-bearing material layer in step f) is elastically, particularly rubber-elastically, supported throughout its entire area (i.e. in case of a circular bore of closed 360°) at its inner periphery (i.e. radially acting outwardly from the inner side of the bore opening). For this reason, step f) has a multiple function. Not only is the spreading force, which is required for fracture-splitting the plain-bearing material layer, applied at the inner periphery of the layer, but the annular-shaped plain-bearing material layer is simultaneously also radially supported at one side during essentially the entire spreading period until the break or the complete break is obtained (that is during the breaking procedure), and was pressed at the other side to the workpiece material of the basic bore. A peeling-off of the plain-bearing material which is critical regarding processing behaviour and which is not desired can be effectively prevented thereby. It is pointed out here that this positive effect cannot be realized with conventional semicircular expansion jaws, which have a considerable intermediate space exactly in the area of the fracture-splitting plane of the work piece, or with expansion bushes which have adjacent spreading elements having respective intermediate spaces.

Further preferred and advantageous embodiment features of the method according to the invention are the subject matter of the subclaims 3 to 7.

The object in accordance with the present invention is further solved by a device according to the present invention having the features of claim 8.

This device for machining workpieces having at least an annular-shaped section, which is to be provided with a split bore, comprises: a fracture-splitting device for fracture-splitting the annular-shaped workpiece section and for creating fracture-split workpiece parts corresponding with one another with a split bore; an applicator device for a plain-bearing material for applying at least one closed annular-shaped plain-bearing layer to the inner periphery of the split bore of the fracture-split workpiece; and a fracture-splitting device for the plain bearing material layer for fracture-splitting the closed annular plain-bearing layer of the fracture-split workpiece.

The fracture-splitting device for the original initial workpiece and the fracture-splitting device for the plain-bearing material layer differ from each other. They may be arranged spatially separated from each other or they may be arranged in direct vicinity of each other, i.e. combined into one unit. Also in case the two devices are spatially separated, it is not inevitably necessary to transfer the workpiece from one device to the other. According to the invention, it is for example conceivable that the workpiece remains in the same clamping device for machining by the various fracture-splitting devices.

The device according to the invention provides the same advantages as the method according to the invention already described above. In addition, the device according to the invention allows complex finishing devices to be dispensed with, as were hitherto necessary for conventional split bearings.

Further preferred and advantageous embodiment features of the device according to the invention are the object of the subclaims 9 to 16.

One preferred embodiment of the invention having additional design features and further advantages is described in detail below with reference to the enclosed drawing.

SHORT DESCRIPTION OF THE DRAWING

The FIGURE shows a schematic, strongly simplified and partially cut lateral view of a fracture-splitting device for a plain-bearing material layer of the device according to the invention which is suited for the realization of the method according to the invention.

DESCRIPTION OF A PREFERRED EMBODIMENT

For the present description it is assumed that the workpiece to be machined by using the method of the invention is a prefabricated connecting rod billet having a not yet split connecting rod base with a bearing bore not yet split. In order that the connecting rod can be later fastened to a crankpin of a crankshaft and operated, the connecting rod billet must be split into two parts, namely into a connecting rod body and a connecting rod cover, in the area of the annular connecting rod base, which contains the bearing bore, and a plain-bearing material must be disposed in the bore. The bore which is not yet provided with the plain-bearing material is also designated below as basic bore.

The following steps are then performed for the above-indicated purpose, however, not inevitably in the given order.

At first, a pre-treatment of the connecting rod billet is carried out which contains the still not split connecting rod bore, and wherein the screw bores for the later connecting rod cover are produced in the connecting rod. In the present example, this working step comprises the machining of the blind-end bores as well as the machining of the inner threads for the screw connection of the cover. Two diametric notches are then attached to the inner periphery of the basic bore e.g. by means of a laser, which provide a preset breaking point.

The billet thus prepared is further machined in a fracture-splitting device in which the connecting rod cover is split along a fracture-splitting plane running through the preset breaking point and, consequently, through the basic bore by applying a spreading force to the inner periphery of the basic bore. For example a conventional device may be used as the fracture-splitting device which is equipped with expansion jaws, expansion bushes or a breaking mandrel.

The fracture-split workpiece parts, i.e. the connecting rod cover and the remaining connecting rod body, are afterwards again assembled and detachably but fixedly connected by screw connection.

Thereupon, a plain-bearing material is applied to the inner periphery of the split basic bore of the previously split connecting rod billet by means of a plain-bearing material applicator device known per se. The plain-bearing material (here: a bearing metal) is, for example, applied by an injection moulding method and forms a relatively thin, closed annular-shaped plain-bearing material layer on the inner periphery of the split basic bore. Although a single layer is only applied in this embodiment, the invention also comprises those variants in which a plurality of plain-bearing material layers are applied in this step.

After completion of the plain-bearing material layer, which has a relatively firm connection not uncritical, however for mechanical stresses deviating from the intended bearing stresses, to the surface of the basic bore, the plain-bearing material layer is subjected to finishing. Finishing is necessary since, as a rule, the plain-bearing material cannot be applied in a completely uniform manner, but is mostly slightly corrugated and uneven, and must consequently be brought to the exact bearing dimensions.

In accordance with the bearing material used, cases are also conceivable in which the finishing step may be omitted.

The connection is again disconnected by unscrewing the screw connection between the connecting rod cover and the connecting rod body. In this procedure, the screw connection can be completely removed or the screw loosened only partially. Due to the bearing material application, the connecting rod cover and the connecting rod body which were completely separated by the previous fraction-split procedure become again connected at the inner edge area of the fracture splitting plane running through the basic bore, which was previously split, by the plain-bearing material layer.

In this condition, the connecting rod billet is subjected to a second fracture-splitting procedure, wherein a spreading force is applied to the entire inner periphery of the annular-shaped, closed plain-bearing material layer, which was formed by spraying-on the bearing material, by a plain-bearing material layer fracture-splitting device, which is described in more detail in the following. At the same time, the plain-bearing material layer is elastically supported along the whole surface from the inner periphery of the bore opening (i.e. acting radially outwardly from the inner periphery of the layer). In addition, the side of the plain-bearing material layer adjacent to the basic bore is pressed towards the workpiece material of the basic bore, whereto it was applied, by the quasi combined spreading and supporting effect.

Thus, the plain-bearing material layer is fracture-split in two annular-shaped halves by means of the plain-bearing material layer fracture-splitting device, and the connecting rod cover is thereby again completely separated from the connecting rod body. The fracture-split plane running through the plain-bearing material layer thereby forms a direct continuation of the fracture-split plane already existing which was produced in the first fracture-splitting step. In order that this is achieved, a previous application of preset breaking points on the plain-bearing material layer is in principle not necessary. The supporting and pressing effect is essentially maintained until breakage is completed. The exact means by which such an effect can be obtained will be described in the following in more detail in connection with the device according to the invention.

If the finishing of the plain-bearing material layer was not performed at an earlier time, it could also be performed at present, i.e. after having been assembled and detachably connected by screwing the connecting rod cover and the connecting rod body in a manner as was described above.

The method according to the invention itself is thereby completed, and further necessary working steps may follow.

The device according to the invention will be described below.

The basic structure and the function of the fracture-splitting device for fracture-splitting the initial workpiece, i.e. the connecting rod billed which is still one piece, and the plain-bearing material applicator were already explained in connection with the method according to the invention, and therefore further explanations regarding these device components may be dispensed with here.

The accompanying FIGURE shows a schematically and strongly simplified lateral view of a possible embodiment of the plain-bearing material layer fracture-splitting device by means of which the fracture-splitting of the closed, annular-shaped plain-bearing material layer can be carried out in the manner as was described in detail above.

As may be taken from the drawing, the plain-bearing material layer fracture-splitting device 2 comprises a support or a base 4 whereon the connecting rod billet 6 to be machined is flatly applied or held or fixed. The corresponding holding or clamping fixtures as well as the screw connection of the connecting rod cover 6.2 and connecting rod body 6.4 are not shown in the drawing for the sake of clarity. Further, the plain-bearing material layer fracture-splitting device 2 is equipped with an elastic spreading and support element 8 (hereinafter element 8) which can be axially inserted into the connecting rod bore formed by the split and coated basic bore 10 and, thus, into the space defined by the inner periphery 16 of the annular-shaped pain-bearing material layer 12, and can be applied to the inner periphery 16 of the pain-bearing material layer 12 with its entire surface. In the present example, the lower side of element 8 also rests on the support 4. The element 8 is loosely inserted into the connecting rod bore opening or fixed to the support 4. In the latter case, the bore opening of the connecting rod 6 is then applied over the stationary arranged element 8. In principle, the element 8 may also be arranged by a separate positioning device within the ring formed by the plain-bearing material layer 12 and/or fastened to the die 22.

The element 8 has an elastically compressible body 8.2 which is essentially produced of an elastomeric material and has a rotation-symmetric, cylindrical or barrel-type shape relative to the bore axis 14. The height H of the elastic element 8 measured in axial direction of the basic bore 10 or the bore opening is greater than the axial depth T of the basic bore 10 or the ring of the plain-bearing material layer. As may be taken from the FIGURE which shows the element 8 in a non-spread condition, the element 8 already essentially completely fills the connecting rod bore or the space defined by the inner periphery 16 of the annular-shaped plain-bearing material layer 12. When in the spread condition, the element 8 will then fill said space completely.

In the present example, the elastically compressible body 8.2 is formed as a solid body. It may, however, also be produced as a hollow body. Irrespective of whether the body is designed as a solid or a hollow body, it may have a structure with different elasticity and/or strength and it may also have a core, shoulders, centering aids, fastening means or the like made of identical or different materials. This allows an elasticity to be obtained which is adapted to the respective application, a deformation behaviour which is required for the application of the entire surface of element 8 or the body thereof to the entire inner periphery 16 of the closed annular-shaped plain-bearing material layer 12, as well as a certain pressing and spreading behaviour.

It may further be taken from the FIGURE that the plain-bearing material layer fracture-splitting device 2 has a pressurization device 18 acting in the direction of the axis 14 of the basic bore 10 on the elastic element 8 or the elastically compressible body 8.2 thereof. In the present embodiment, this pressurization device 18 has a hydraulic cylinder 20 with a retractable and extendable die 22 which can be applied to the upper side of the elastic element 8 via its lower side 24, i.e. to the upper portion thereof which projects from the connecting rod opening. However, instead of a hydraulic pressure applying device, mechanical, pneumatical, electrical, electromagnetical, electrohydraulical pressurization devices as well as mixed forms thereof are also possible along the lines of the invention.

The die 22 is lowered and the bottom side 24 thereof is pressed onto the elastic element 8 (in an embodiment in which the element is fastened to the die 22, the element 8 is preferably pressed to the support or the basic body 4) for the fracture-splitting of the plain-bearing material layer 12 of the prepared connecting rod billet 6 (see the above explanations regarding the method of the invention). The elastic element 8 or the body 8.2 thereof is thereby compressed and is deformed in the axial as well as in the radial direction within the ring formed by the plain-bearing material layer 12 or within the connecting rod bore opening. The entire surface of the elastic element 8 is thereby applied to the inner periphery 16 of the closed annular-shaped plain-bearing material layer 12.

The elastic element 8 or the body 8.2 thereof thereby exerts a radial spreading force onto the plain-bearing material layer 12, whereas it simultaneously elastically supports the entire surface of the plain-bearing material layer 12 from the inside of the bore opening (i.e. from the inner periphery 16 of the layer 12 radially outwardly), and, in addition to this, presses the side of the plain-bearing material layer 12 adjoining the basic bore 10 towards the workpiece material of the basic bore 10, to which the layer 12 was applied. When a predetermined spreading force was obtained, which may in particular be taken from the material parameters and the thickness of the plain-bearing material layer 12 as well as the holding conditions of the workpiece 6, the plain-bearing material layer 12 is fracture-split into two annular-shaped halves and the connecting rod cover 6.2 is thereby again completely separated from the connecting rod body 6.4. When the breaking procedure is completed, the die 22 is retracted and element 8 released. In this procedure, the element 8 elastically deforms and again obtains its initial form.

Although the pressure application of the elastic element 8 was only performed from one side in the above-described embodiment, with the reaction providings the corresponding counterforce to the support 4, the invention also comprises those variants, in which the elastic element 8 is compressed from both sides of the bore. In this case, a second hydraulic cylinder 20 having a second die 22 must be provided and the support 4 must correspondingly be provided with a recess. In such a case, the height or thickness of the elastic element 8 measured in the axial direction of the bore 10 must appropriately be selected such that the element 8 projects from both sides of the bore opening when in the unloaded condition. Instead of a flat arrangement of the connecting rod 6 to be machined on the support 4, it would also be possible that the connecting rod 6 is held on edge and that the dies 22 are moved in the horizontal direction.

The invention is not limited to the above embodiments which only serve as a general explanation of the main idea of the invention. Within the scope of protection, the method according to the invention and the device according to the invention may also take other forms than those above. In particular, the method and the device therein can have features which represent a combination of the respective individual features of the accompanying claims.

As was mentioned above, although with the method according to the invention it is not basically required for fracture-splitting the plain-bearing material layer that a preset breaking point is provided, the present invention optionally contains this possibility for especially thick plain-bearing material layers and/or especially viscous bearing materials. The application of such preset breaking points is to be appropriately performed after the production of the plain-bearing material layer but prior to fracture-splitting the layer. It is possible to split the plain-bearing material layer in a machining procedure. In accordance with the method of the invention, the plain-bearing material layer may be split at least partially by machining, and the remaining part may then be fracture-split.

In particular it is also provided that the device according to the invention is equipped with suitable operation elements as well as control and/or automatic control devices. Within the scope of the present invention, the plain-bearing material layer fracture-splitting device may further have suitable holding elements, clamping devices and/or guiding devices for the workpiece to be machined.

Although the elastic spreading and support element of the above embodiment is designed as an elastically compressible body, the present invention also comprises such constructions in which the elastic spreading and support element has an elastically expandable hollow body which completely fills the space defined by the inner periphery of the plain-bearing material layer. It is preferred that such a hollow body also comprises one or more elastomeric materials. The hollow body has a shape which is correspondingly adapted to the geometry and dimensions of the bore. Spherical, cylindrical or barrel-shaped hollow bodies have proven to be particularly suited. It has to be taken into account that the hollow body may have a significantly smaller dimension in the non-expanded condition than the corresponding workpiece bore. Appropriately, the inner space of the hollow body is connected to an internal pressurization device 30, as shown. Gaseous or liquid media are especially suited for generating an internal pressure in order to expand the hollow body. The mode of action of the elastically expandable hollow body essentially corresponds to that of the elastically compressible body.

It is not inevitably necessary that the elastically compressible body as well as the elastically expandable hollow body of the plain-bearing material layer fracture-splitting device have a symmetrical or circular cross-section relative to the bore axis of the workpiece. The corresponding body may also have an asymmetrical or uneven cross-sectional form when in the compressed or expanded condition and/or may have different radial dimensions within a cross-section in particular in the area of the fracture-splitting plane of the annular-shaped plain-bearing material layer to be obtained. The elastically compressible body may, for example, have an oval cross-sectional form, the longer cross-sectional axis thereof essentially extending along the subsequent fracture-splitting plane of the plain-bearing material layer. This allows certain deformation, spreading, supporting and pressing properties of the plain-bearing material layer to be obtained in the corresponding elastically deformable bodies.

Instead of the above-described spraying device for the bearing material, the plain-bearing material applicator device may also comprise a plain-bearing-material-casting, centrifugal-casting, web-casting, rolling-on, roll-bonded cladding, vapour-deposition, electroplating device or the like.

The reference numerals in the claims, the description and the drawings only serve for a better understanding of the invention and are not to be understood as a restriction of the scope of protection.

LIST OF REFERENCE NUMERALS 2 fracture-splitting device for plain-bearing material layer
4 support/base
6 connecting rod billet/workpiece
6.2 connecting rod cover
6.4 connecting rod body
8 elastically deformable spreading and support element
8.2 elastically compressible body of 8
10 basic bore/connecting rod bore
12 annular-shaped plain-bearing material layer
14 bore axis
16 inner periphery of 12
18 pressure applying device
20 hydraulic cylinder of 18
22 die of 18
24 bottom side of 22
H height of 8
T axial depth of the bore 10

The invention claimed is:

1. A method for machining workpieces which have at least one annular-shaped workpiece section that is to be provided with a split bore, the method comprising the following steps:
   a) providing a workpiece having at least one preset breaking point and at least one annular-shaped workpiece section defining a bore;
   b) applying a spreading force to an inner periphery of the bore for fracture-splitting the at least one annular-shaped workpiece section and for creating fracture-split workpiece parts corresponding with one another with a split bore;
   c) mating and detachably connecting the fracture-split workpiece parts resulting from step b);
   d) applying of at least one closed annular plain-bearing layer to the inner periphery of the split bore of the fracture-split workpiece;
   e) disengaging the connection between the mated workpiece parts;
   f) applying a spreading force to the entire inner periphery of the closed annular plain-bearing layer for fracture-splitting the plain bearing material layer, the entire area of the annular-shaped plain-bearing material layer being elastically supported at its inner periphery.

2. The method according to claim 1, characterized in that the application of the at least one plain-bearing material layer is performed by casting, centrifugal-casting, web-casting, rolling-on, roll-bonded cladding, evaporation, sputtering, or electroplating.

3. The method according to claim 1, characterized in that in step d) a plurality of plain-bearing material layers are applied.

4. The method according to claim 1, characterized in that the applied plain-bearing material layer is finished after step d) and prior to step e) or f).

5. The method according to claim 1, characterized in that after step t) the fracture-split workpiece parts obtained by steps b) and f) are again mated and detachably connected to each other and
   the applied plain-bearing material layer is then finished.

6. The method according to claim 1, characterized in that after step d) and prior to step f) at least one preset breaking point of the plain-bearing material layer is produced on the inner periphery of the plain-bearing material layer.

7. A device for machining workpieces which have at least one annular-shaped workpiece section that is to be provided with a split bore, comprising:
   a fracture-splitting device for fracture-splitting the annular-shaped workpiece section and for creating fracture-split workpiece parts corresponding with one another with a split bore,
   an applicator device for a plain-bearing material for applying at least one closed annular plain-bearing material layer to the inner periphery of the split bore of a fracture-split workpiece, and
   a fracture-splitting device for the plain-bearing material layer for fracture-splitting the closed annular plain-bearing layer of the fracture-split workpiece, which has at least one elastically deformable spreading and support element which can be axially inserted into the opening formed by the split bore having the plain-bearing material layer and which can be applied over its entire area to the inner periphery of the annular-shaped plain-bearing material layer.

8. The device according to claim 7, characterized in that the elastically deformable spreading and support element has an elastically compressible body which essentially completely fills a space defined by the inner periphery of the annular-shaped plain-bearing material layer and which has a height measured in the axial direction of the bore which is greater than the axial depth of the bore.

9. The device according to claim 8, characterized in that the elastically compressible body has a shape which is essentially cylindrical or of barrel-type.

10. The device according to claim 8, characterized in that the fracture-splitting device for plain-bearing material layer has a pressurization device acting upon the elastically compressible body.

11. The device according to claim 7, characterized in that the elastically compressible body comprises at least an elastomeric material.

12. The device according to claim 7, characterized in that the elastically deformable spreading and support element has an elastically expandable hollow body which essentially completely fills the space defined by the inner periphery of the annular-shaped plain-bearing material layer.

13. The device according to claim 12, characterized in that an inner space of the hollow body is connected to an internal pressurization device.

* * * * *

UNITED STATES PATENT AND TRADEMARK OFFICE
CERTIFICATE OF CORRECTION

PATENT NO. : 7,127,814 B2 Page 1 of 1
APPLICATION NO. : 10/477013
DATED : October 31, 2006
INVENTOR(S) : Horst Wisniewski It is certified that error appears in the above-identified patent and that said Letters Patent is hereby corrected as shown below:

In Claim 5, col. 10, line 40, "t)" should be changed to --f)--.

Signed and Sealed this

Second Day of January, 2007

JON W. DUDAS
*Director of the United States Patent and Trademark Office*